(12) United States Patent
Chen

(10) Patent No.: US 6,827,506 B2
(45) Date of Patent: Dec. 7, 2004

(54) DUPLEX FOCUSING DEVICE

(76) Inventor: Wei-Wen Chen, 235 Chung-Ho Box 8-24, Taipei (TW)

( * ) Notice: Subject to any disclaimer, the term of this patent is extended or adjusted under 35 U.S.C. 154(b) by 130 days.

(21) Appl. No.: 10/348,224

(22) Filed: Jan. 22, 2003

(65) Prior Publication Data
US 2004/0141698 A1 Jul. 22, 2004

(51) Int. Cl.$^7$ ................................................ G02B 6/36
(52) U.S. Cl. ............................ 385/93; 385/35; 385/88
(58) Field of Search ........................... 385/33, 35, 49, 385/88–94

(56) References Cited

U.S. PATENT DOCUMENTS 4,307,934 A * 12/1981 Palmer ........................ 385/93
6,053,641 A * 4/2000 Chun .......................... 385/93
6,748,143 B2 * 6/2004 Kuhara et al. ............... 385/49

* cited by examiner

Primary Examiner—Phan T. H. Palmer

(57) ABSTRACT

A duplex focusing device is installed a duplex light transceiver module for transmitting light signals. The duplex focusing device comprises a ball lens assembly and a body. The ball lens assembly has a first lens and a second lens both being symmetrical half ball matching to each other. A layer of wavelength-division medium is placed between the first and second lens to ensure that light transmitted from a laser diode will transmit through the ball lens assembly. Thereby, the light transmitting into the ball lens assembly will have a part being reflected by the second lens. The body serves for receiving and fixing the ball lens. The body is formed to cause that both orientations of the first lens and the second lens are adjustable with respect to the body.

4 Claims, 4 Drawing Sheets

DUPLEX FOCUSING DEVICE

BACKGROUND OF THE INVENTION

(1) Field of the Invention

The present invention relates to optic devices, and particularly to a duplex focusing device which is installed in a duplex light transceiver module, and more specifically the present invention provides a focusing means capable of altering a ball lens assembly controlled by the light transceiver module so that light can be easily coupled to an optical fiber and an optic detector reliably.

(2) Description of the Prior Art

In current optic communication systems, laser diodes are generally used as light sources. A packaged laser diode is as a laser diode element 1a. A packaged light detector is as a light detection element 2a. Referring to FIGS. 1A and 1B, it is seen that a laser diode element 1a and a light detection components 2a are mounted inside a metal fixture 3 as a light transmitting module 1a and a light receiving module 2. Then the light transmitting module 1a, light receiving module 2 and a body 4, are packaged as a duplex light transceiver module 5. The interior of the body 4 is provided with an optical filter 6. The upper and lower surfaces of the optical filter 6 are evaporation-coated with mediums of different transmission index. Thus it causes that light radiated from laser diode element 1a is coupled to an optical fiber 9a via the optic filter 6. Then the light that is completely reflected to a light detector 2a through the optical filter 6.

The optic filter 6 is fixed to a frame 8 of a filter holder 7 and the filter holder 7 is inserted into the body 4. Next, the optic filter 6 is adjusted to an optimum orientation to assure that reflection or refraction of the incident light radiating into the optic filter has an optimum result. That is, after the filter holder 7 is inserted into the fixture 3. The holder 7 must be adjusted to an optimum orientation with respect to the optic filter 6, and this step is inconvenient for the operation.

Moreover, in the prior art, ball lenses 9 are mounted directly to both the laser diode element 1a and the light detector 2a. As a result, displacement of the laser diode element 1a will cause the focusing lens into simultaneous movement. Thereby, the focusing positions of light to the optical fiber 9a and the light detector 2a are changed greatly. Therefore the coupling operation is difficult and the optical property is not preferred.

SUMMARY OF THE INVENTION

Accordingly, the primary object of the present invention is to provide a duplex focusing device installed a duplex light transceiver module for the transmission of light signals. The duplex focusing device comprises a ball lens assembly having a first lens and a second lens both being symmetrical half ball matching to each other. A layer of wavelength-division medium being placed between the first and second lens to ensure that light transmitted from a laser diode will transmit through the ball lens assembly; thereby, the light transmitting into the ball lens assembly will have a part being reflected by the second lens.

Another object of the present invention is to provide duplex focusing device, wherein the body serves for receiving and fixing the ball lens; the body being formed by a front part and a rear part; each of the front part and the rear part having an annular rim and a correspondingly annular protrusion linked to said annular rim; the annular protrusion being formed a notched groove to accommodate ball lens assembly so that both orientations of the first lens and the second lens are adjustable with respect to the body.

A further object of the present invention is to provide a duplex focusing device, wherein the duplex focusing device is placed in a duplex light transceiver module; and the duplex light transceiver module has an optical fiber connected element, a light receiving module and a light transmitting module which are arranged around the duplex focusing device.

The various objects and advantages of the present invention will be more readily understood from the following detailed description when read in conjunction with the appended drawing.

DETAILED DESCRIPTION OF THE PREFERRED EMBODIMENT

Figure 1A:
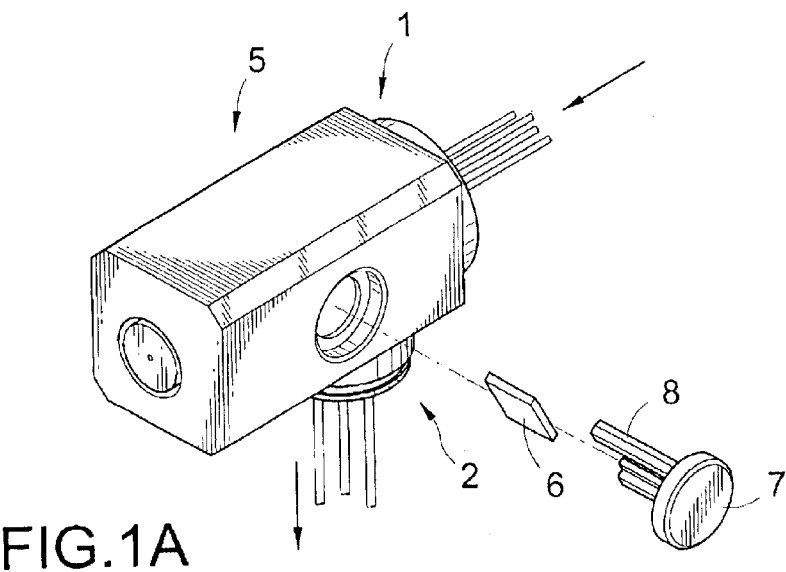
FIGS. 1A and 1B shows the perspective view of a prior art duplex light transceiver module assembly.
Figure 1B:
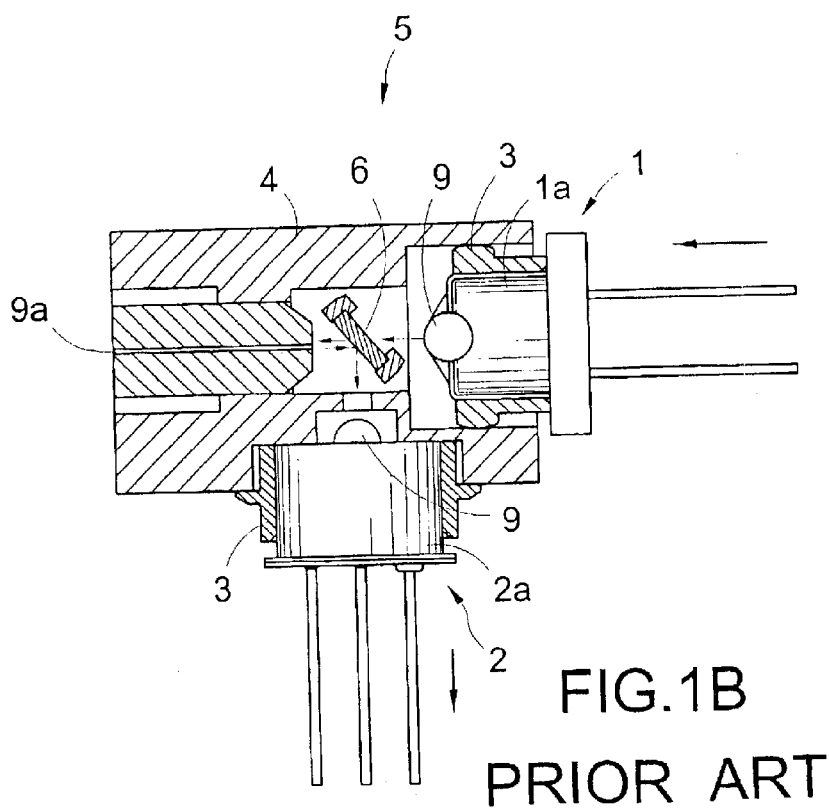
Figure 2:
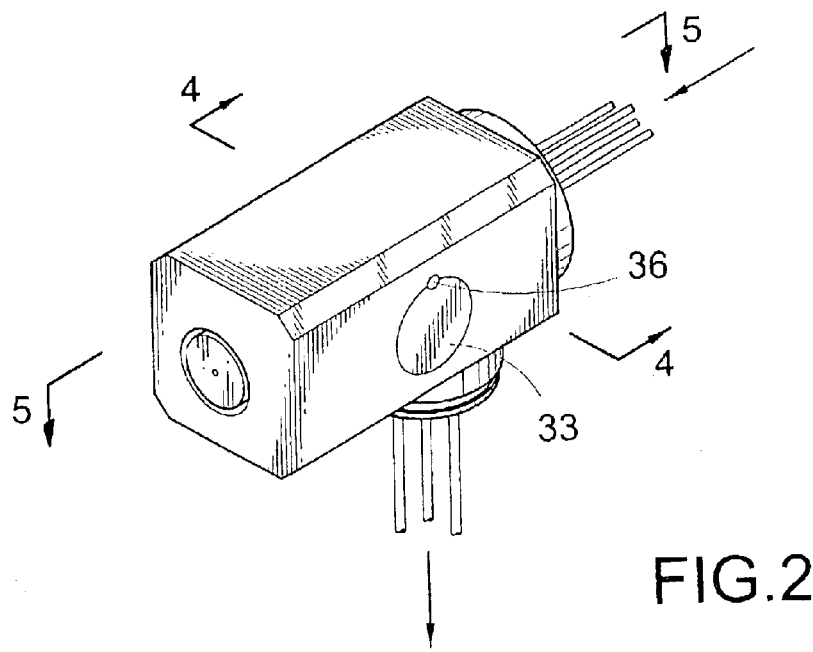
FIG. 2 is a perspective view of the present invention.
Figure 3:
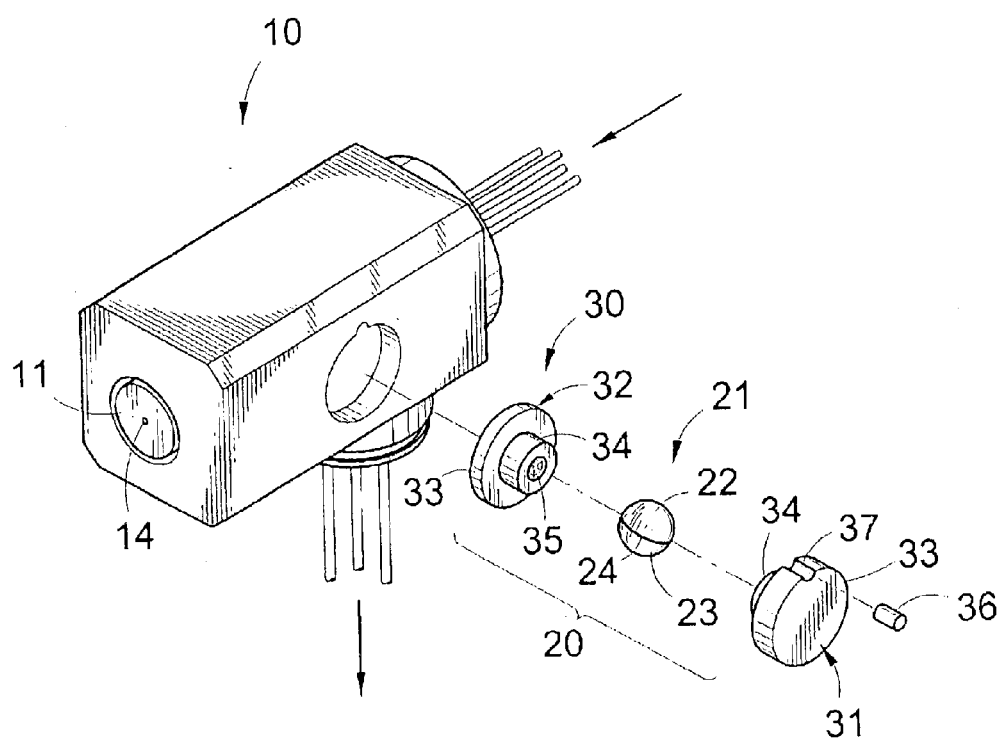
FIG. 3 is an exploded perspective view of the duplex focusing device and duplex light transceiver module according to the invention.

Referring to FIG. 2 and FIG. 3, in the present invention, a duplex focusing device 20 is installed with a duplex light transceiver module 10 for the transmission of light signals. The duplex focusing device 20 comprises a ball lens assembly 21 and a body 30 for fixing the ball lens assembly 21.

The ball lens assembly 21 comprises a first lens 22 and a second lens 23 both being symmetrical half ball matching to each other. A layer of wavelength-division medium 24 is placed between the first and second lens 22, and 23 to ensure that light transmitted from the laser diode component will transmit through the ball lens assembly 21. Thereby, the light transmitting into the ball lens assembly 21 will have a part being reflected by the second lens 23.

The body 30 consists of a front part 31 and a rear part 32. Each of the front part 31 and the rear part 32 has an annular rim 33 and a correspondingly annular protrusion 34 linked to the annular rim 3. The annular protrusion 34 is formed a notched groove 35 to accommodate ball lens assembly 21 so that both the first lens 22 and the second lens 23 may be adjusted to an optimum orientation with respect to body 30.

Figure 4:
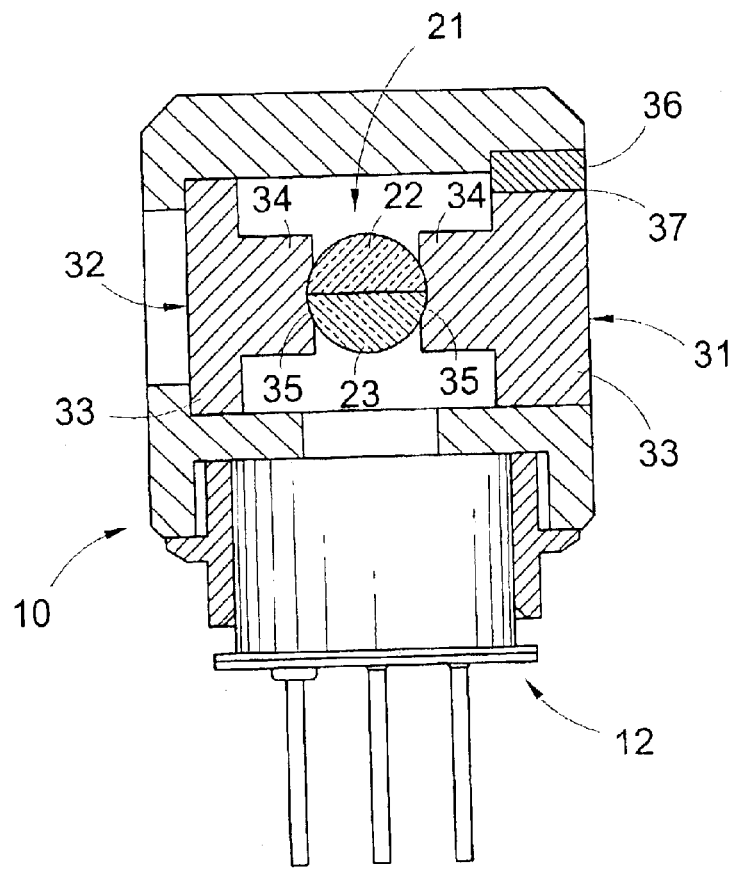
FIG. 4 is a cross-sectional view along lines 4—4 of FIG. 2.

The ball lens assembly 21 and the body 30 are formed as the duplex focusing device 20 according to the invention. Then the duplex focusing device 20 is placed in the duplex light transceiver module 10. Then a pin 36 is inserted into a hole 37 formed on the annular aim 33, so as to fix the duplex transceiver module 10, as illustrate in FIG. 4. Thereby, the orientation of the duplex focusing device 20 is adjusted.

Figure 5:
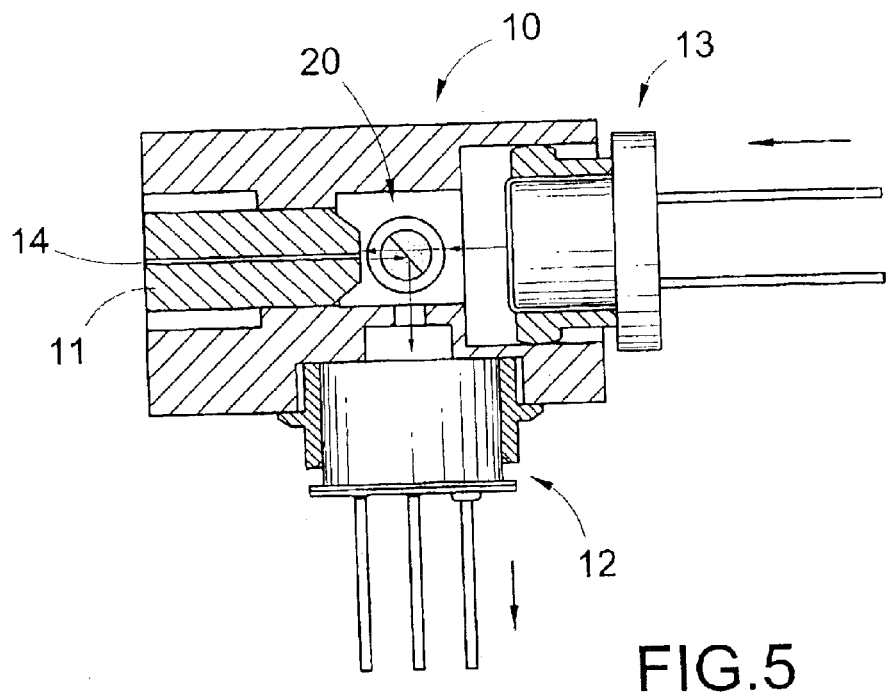
FIG. 5 is a cross-sectional view along lines 5—5 of FIG. 2.
Figure 6:
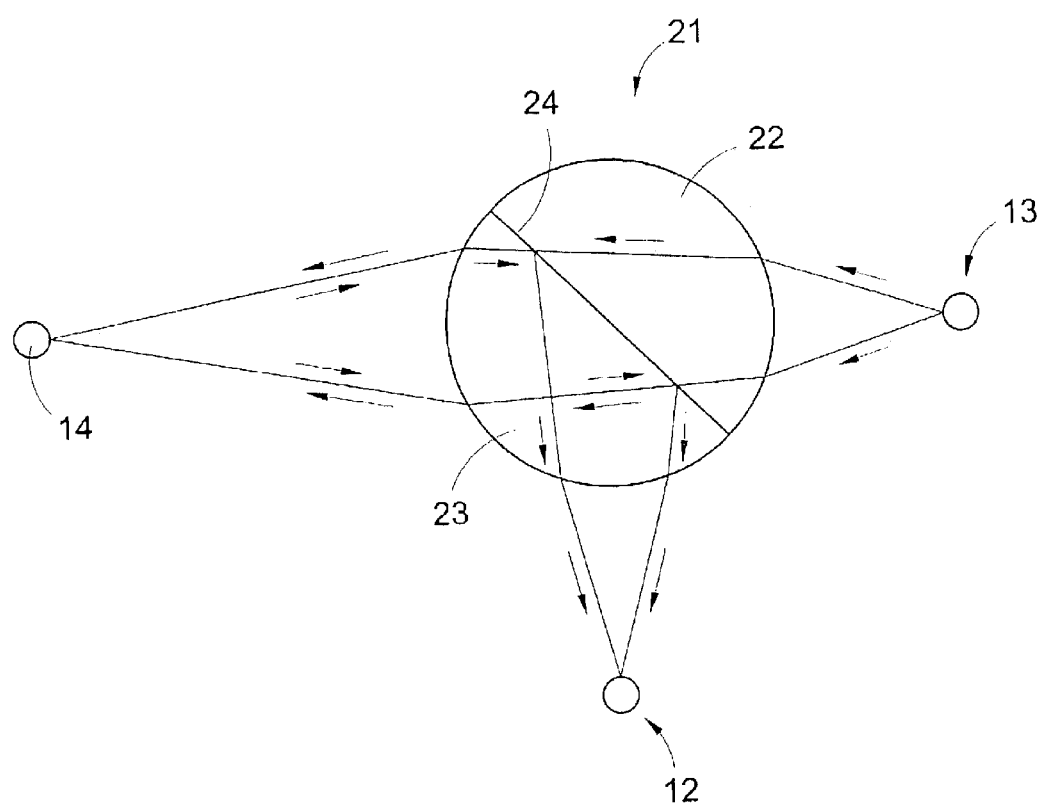
FIG. 6 shows the optic circuit showing the duplex focusing assembly of the present invention.

FIG. 5 represents an optimum installation showing the duplex focusing device 20 of the present invention being mounted in the duplex light transceiver module 10. The duplex light transceiver module 10 has an optical fiber connected element 11, a light receiving module 12 and a light transmitting module 13, with the optical fiber connected element 11 and the light receiving module 12, the light transmitting module 13 adjoining to each other with predetermined orientation. The optical fiber connected element 11 is made of pottery or porcelain and coaxially comprises an optical fiber 14. Referring to the optic path the shown in FIG. 6, light from the laser diode of the light transmitting module 13 will pass through the first lens 22 and the second lens 14 so that light is focused in the optical fiber 14. Light received by the optical fiber 14 will pass through the second lens 23 and then to the wavelength-division medium 24. Then the light is reflected and focusing to a light detector (not shown) through the light receiving module 12.

In summary, the ball lens assembly 21 of the present invention is adjusted to an optimum orientation and then is combined to the body 30. Then it is accurately and reliably combined to duplex light transceiver module 10. The focusing position remains absolutely free and unrestrained by any shifting effects due to either the light receiving module 12 or the light transmitting module 13, such that the stream of light beam that is received or transmitted in the process will be focused completely onto the ball lens assembly 21. As a result, the coupling efficiency between the light source, associated optical fiber and light detection implements is increased.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A duplex focusing device having a duplex light transceiver module for the transmission of light signals, the duplex focusing device comprising:

a ball lens assembly having a first lens and a second lens both being symmetrical half ball matching to each other, a layer of wavelength-division medium being placed between the first and second lens to ensure that light transmitted from a laser diode will transmit through the ball lens assembly, thereby, the light transmitting into the ball lens assembly will have a part being reflected by the second lens;

a body for receiving and fixing the ball lens, the body being formed by a front part and a rear part, each of the front part and the rear part having an annular rim and a correspondingly annular protrusion linked to said annular rim, the annular protrusion being formed a notched groove to accommodate ball lens assembly so that both orientations of the first lens and the second lens are adjustable with respect to the body.

2. The duplex focusing device as claimed in 1, wherein the duplex focusing device is placed in a duplex light transceiver module, and the duplex light transceiver module has an optical fiber connected element, a light receiving module and a light transmitting module which are arranged around the duplex focusing device, wherein light from the laser diode of the light transmitting module will pass through the first lens and the second lens so that light is focused to the optical fiber, and light received by the optical fiber will be reflected toward the second lens and then to the wavelength-division medium, then the light is reflected and focusing to a light detector through the light receiving module.

3. The duplex focusing device as claimed in claim 1, wherein the body is fixed to the duplex light transceiver module by pins.

4. The duplex focusing device as claimed in claim 1, wherein each of the first lens and the second lens is a hemisphere and the first lens and second lens are symmetrical.

* * * * *